(12) United States Patent
Fleizach et al.

(10) Patent No.: US 8,706,794 B1
(45) Date of Patent: Apr. 22, 2014

(54) NO-MULTIPLY DIGITAL SIGNAL PROCESSING METHOD

(76) Inventors: Gregory K. Fleizach, San Diego, CA (US); Ralph W. Hunt, San Marcos, CA (US); Barry R. Hunt, San Diego, CA (US)

( * ) Notice: Subject to any disclaimer, the term of this patent is extended or adjusted under 35 U.S.C. 154(b) by 442 days.

(21) Appl. No.: 13/216,030

(22) Filed: Aug. 23, 2011

(51) Int. Cl.
G06F 7/487 (2006.01)

(52) U.S. Cl.
USPC .......................................... 708/622

(58) Field of Classification Search
None
See application file for complete search history.

(56) References Cited

U.S. PATENT DOCUMENTS

| | | | | |
|---|---|---|---|---|
| 3,800,130 | A * | 3/1974 | Martinson et al. | 708/404 |
| 4,896,287 | A * | 1/1990 | O'Donnell et al. | 708/622 |
| 6,005,887 | A | 12/1999 | Bottomley et al. | |
| 6,874,006 | B1 * | 3/2005 | Fu et al. | 708/442 |
| 7,203,718 | B1 * | 4/2007 | Fu et al. | 708/622 |
| 2007/0280382 | A1 | 12/2007 | Batra et al. | |

OTHER PUBLICATIONS

Murat Belge, Orhan Arikan, Fast RLS Algorithms Running on Roughly Quantized Signals, downloaded from internet at http://citeseerx.ist.psu.edu/viewdoc/summary?doi=10.1.1.56.6373, on Aug. 4, 2011.

Oscar Gustafsson, and Fahad Qureshi, Addition Aware Quantization for Low Complexity and High Precision Constant Multiplication, IEEE Signal Processing Letters, vol. 17, No. 2, Feb. 2010.

Michael P. Lamoureux, The Poorman's Transform: Approximating the Fourier Transform without Multiplication, IEEE Transactions on Signal Processing, vol. 41, No. 3, Mar. 1993.

Soontorn Oraintara, Ying-Jui Chen, and Truong Q. Nguyen, Integer Fast Fourier Transform, IEEE Transactions on Signal Processing, vol. 50, No. 3, Mar. 2002.

Sam Mavandadi, Parham Aarabi, and K. N. Plataniotis, Fourier-Based Rotation Invariant Image Features, IEEE 978-1-4244-5654-3/09, ICIP 2009.

* cited by examiner

*Primary Examiner* — David H Malzahn
(74) *Attorney, Agent, or Firm* — SPAWAR Systems Center Pacific; Kyle Eppele; J. Eric Anderson

(57) ABSTRACT

A method for processing a digital signal, comprising the following steps: receiving a complex-valued input data array with a processor; converting the complex-valued input data array into a quantized polar domain by approximating magnitude and quantizing the phase data of the input data array with the processor; storing the approximated magnitude in a phase-column indexed matrix in a memory store that is operatively coupled to the processor; processing the input data array with the processor such that all multiplications and summations that would occur during signal processing of the input data array in the Cartesian domain are substituted with circular row shifts and additions of phase-column indexed values in the quantized polar domain; and converting the processed input data array back into the Cartesian domain.

18 Claims, 6 Drawing Sheets

NO-MULTIPLY DIGITAL SIGNAL PROCESSING METHOD

FEDERALLY-SPONSORED RESEARCH AND DEVELOPMENT

This invention is assigned to the United States Government and is available for licensing for commercial purposes. Licensing and technical inquiries may be directed to the Office of Research and Technical Applications, Space and Naval Warfare Systems Center, Pacific, Code 72120, San Diego, Calif., 92152; voice (619) 553-5118; ssc_pac_t2@navy.mil. Reference Navy Case Number 100853.

BACKGROUND OF THE INVENTION

This invention is generally applicable to any methods in the field of digital signal processing (DSP) where multiplications are utilized. Standard DSP typically involves complex multiplications (e.g., filters, discrete Fourier transforms (DFTs), frequency shifting, etc.), which can be expensive in hardware in terms of size and power consumption. For example, the brute force multiplication of two complex numbers is $(a+jb)\cdot(c+jd)=(ac-bd)+j(ad+bc)$, which requires four real multiplications and two real additions (where a subtraction is just the addition of a negative number). A more efficient complex multiplication in terms of real multiplications is $(a+jb)\cdot(c+jd)=[(d(a-b)+a(c-d))]+j[c(a+b)-a(c-d)]$ where it can be seen that the second term of the real and imaginary component is the same. Thus, this method requires only three multiplications, but five additions. This is usually a good tradeoff because of how computationally expensive multiplications are for hardware or embedded processors. However, three real multiplications are still required for each complex multiplication. To perform many DSP tasks a multiply-accumulate approach is necessary where many multiplications are followed by a sum of the results (e.g., a FIR filter). One can see that for long filters and/or long signals the number of multiplications can grow quickly. Again, all of these multiplications are very expensive in physical space (in hardware), time (in embedded processors), and power.

SUMMARY

Described herein is a method for processing a digital signal, comprising the following steps: receiving a complex-valued input data array with a processor; converting the complex-valued input data array into a quantized polar domain by approximating magnitude and quantizing the phase data of the input data array with the processor; storing the approximated magnitude data in a phase-column indexed matrix in a memory store that is operatively coupled to the processor; processing the input data array with the processor such that all multiplications and summations that would occur during signal processing of the input data array in the Cartesian domain are substituted with circular row shifts and additions of phase-column indexed values in the quantized polar domain; and converting the processed input data array back into the Cartesian domain.

Also described herein is another embodiment of the method for processing a digital signal, which eliminates the need to perform multiplications. This embodiment comprises the first step of receiving a complex-valued input data array $X_N$ in a Cartesian domain with a processor, wherein N is the length of the input data array $X_N$. The next step is converting the input data array $X_N$ into a quantized polar domain by: approximating the magnitude $A_n$ of an input sample n, wherein the input sample n is a portion of the input data array $X_N$, and mapping a phase value of the input sample n to one of L quantized phases, represented by integers from 0 to L−1. Another step comprises indexing the approximated magnitude $A_n$ and the phase value of the input sample n to an N×L matrix, wherein the sample number n indicates the row number of the N×L matrix and the quantized phase integer indicates the column number of the N×L matrix, and wherein the N×L matrix is stored in a memory store operatively coupled to the processor. Another step comprises repeating the previous two steps for all constituent input samples of the input data array $X_N$ thereby populating the N×L matrix. Other steps comprise phase quantizing a constant modulus multiplicand $s_M$, wherein M is the length of a reference signal and choosing an M×L subset of the N×L matrix as multiplicands and circularly shifting each of M rows to the right by the $m^{th}$ quantized phase value of the multiplicand $s_M$. The last step comprises converting the circularly shifted rows back to Cartesian coordinates.

BRIEF DESCRIPTION OF THE DRAWINGS

Throughout the several views, like elements are referenced using like references. The elements in the figures are not drawn to scale and some dimensions are exaggerated for clarity.

DETAILED DESCRIPTION OF EMBODIMENTS

Figure 1:
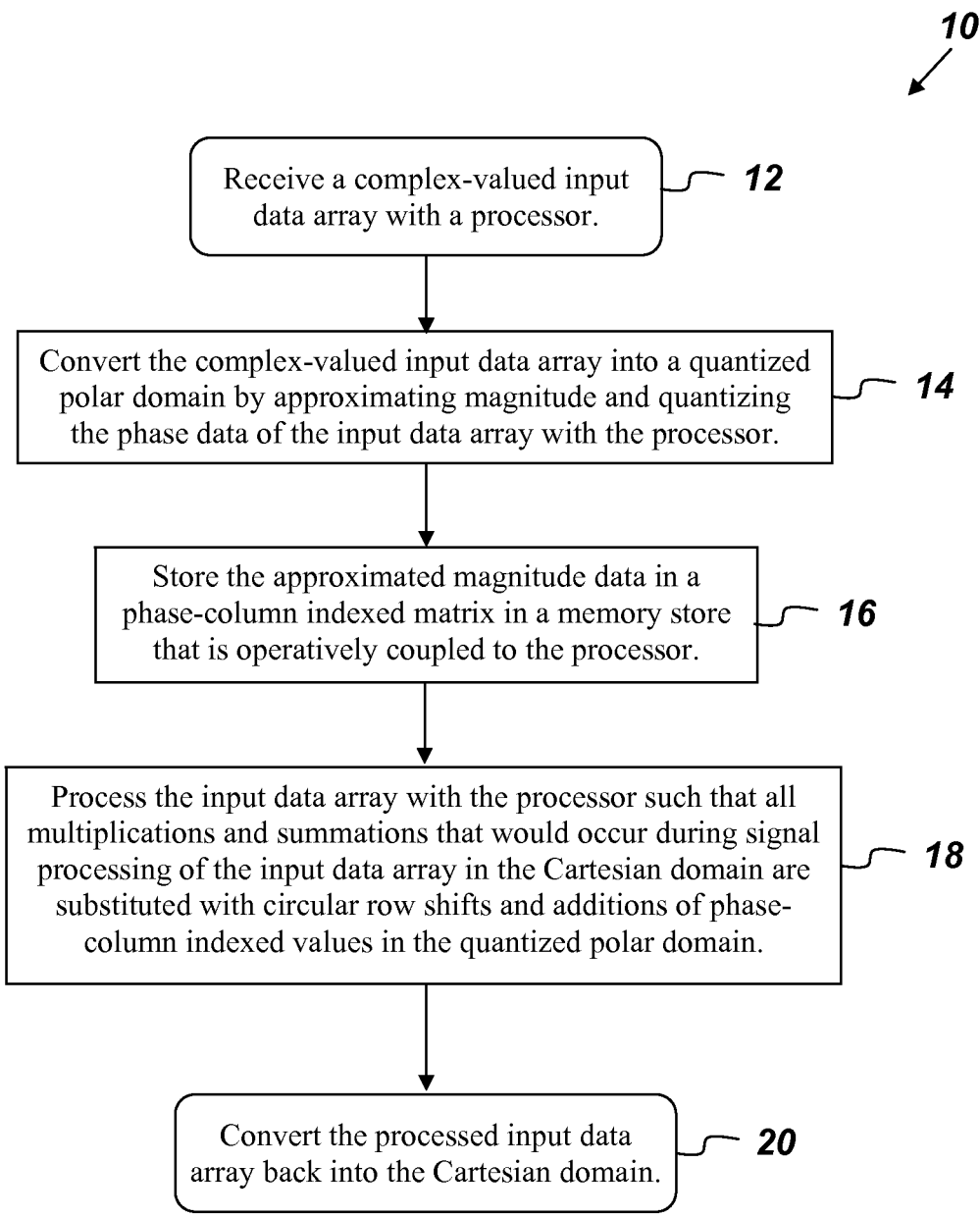
FIG. 1 is a flowchart of a simplified method for digital signal processing (DSP) that does not require multiplications.

FIG. 1 is a flowchart of a simplified method 10 for digital signal processing (DSP) that does not require multiplications. The first step 12 of the DSP method 10 provides for receiving a complex-valued input data array with a processor. Throughout this application, complex numbers/values/expressions/etc. are understood to be numbers in the Cartesian domain having a real segment (in-phase or I) and an imaginary segment (quadrature or Q). The next step 14 provides for converting the complex-valued input data array into a quantized polar domain by approximating magnitude and quantizing the phase data of the input data array with the processor. Step 16 provides for storing the approximated magnitude data in a phase-column indexed matrix in a memory store that is operatively coupled to the processor. Thus, the value and column of an element in the phase-column indexed matrix denote the approximate magnitude and phase of that data sample, respectively. This is in contrast to the I/Q (i.e., real and imaginary) format in which complex numbers are typically stored. Step 18 provides for processing the input data array with the processor such that all multiplications and summations that would occur during signal processing of the input data array in the Cartesian domain are substituted with circular row shifts and additions of phase-column indexed values in the quantized polar domain. Then, step 20 provides for converting the processed input data array back into the Cartesian domain. Thus the no-multiply DSP method 10 obviates the need for multiplications of complex numbers in DSP functions.

The DSP method 10 may be utilized in any DSP function that involves multiplication of complex numbers. Suitable examples of DSP functions in which the DSP method 10 may be used include, but are not limited to, finite impulse response (FIR) filters, discrete Fourier transforms (DFTs), fast Fourier transforms (FFTs), and frequency shifts. The processor utilized in DSP method 10 may be any processor capable of computing the steps of DSP method 10. The DSP method 10 is particularly well-suited to hardware and embedded processing applications where multiplications come at a great expense. For example, the DSP method 10 may be implemented in, but is not limited to, embedded processors and field programmable gate arrays (FPGAs) via hardware design languages or in an application specific integrated circuit (ASIC).

The memory store utilized in the method 10 to store the phase-column indexed values may be any type of memory device such as random access memory devices including, but not limited to dynamic random access memory devices (DRAM), synchronous dynamic random access memory devices (SDRAM), double-data rate dynamic random access memory device (DDR SDRAM), and/or other volatile memory devices.

Figure 2:
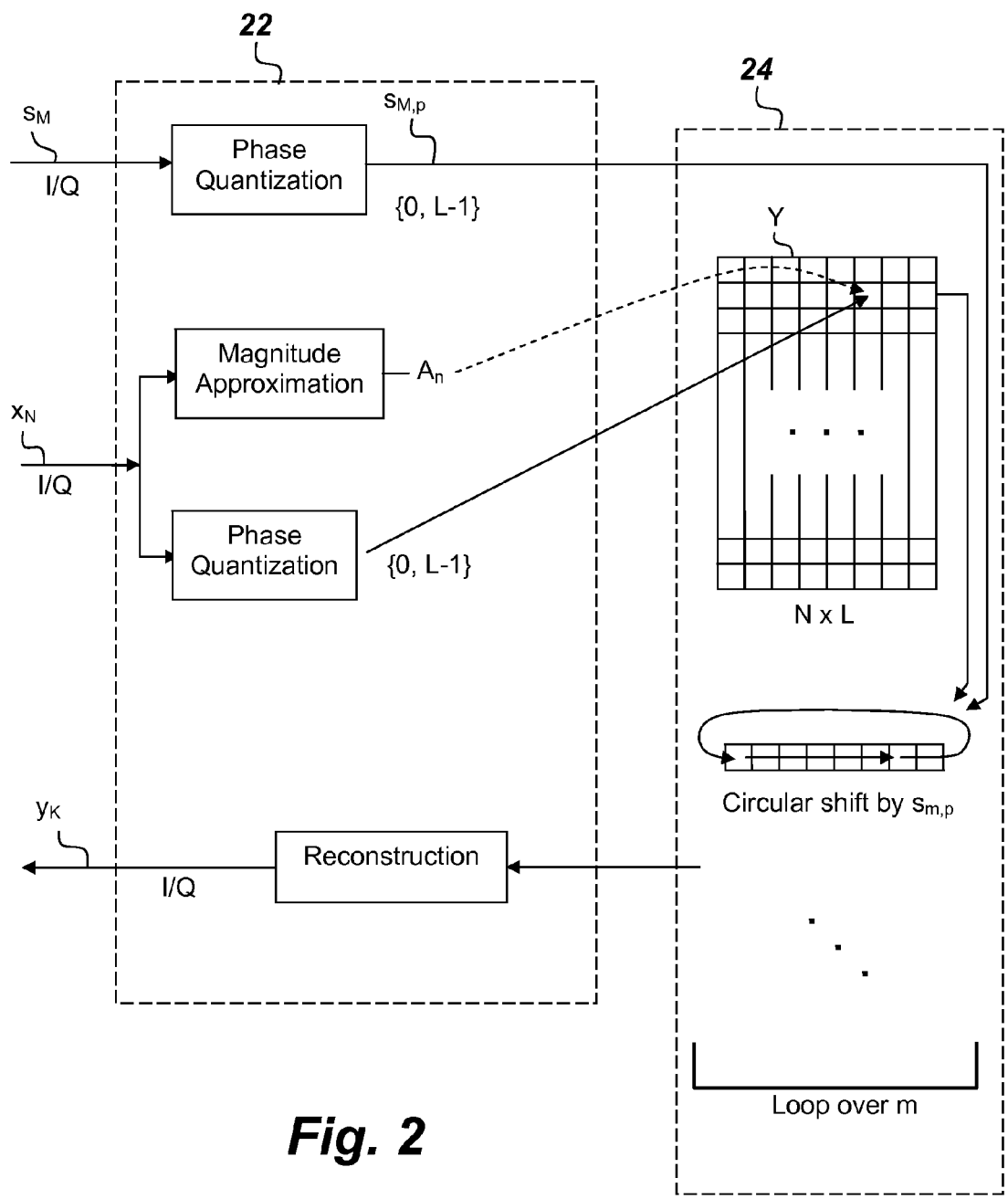
FIG. 2 is a block diagram illustrating an example embodiment of the DSP method.

FIG. 2 is a block diagram illustrating one example embodiment of the DSP method 10. In this embodiment, the processor 22 receives a complex-valued input data array $X_N$, where N is the length of the input data array $X_N$ (note that N can be as small as 1) where $x_N$ has digital values, but an arbitrary range. The processor then converts the input data array $X_N$ into the quantized polar domain by approximating the magnitude $A_n$ of an input sample n and mapping a phase value of the input sample n to one of L quantized phases, represented by integers from zero to L−1. That is, the I/Q values are transformed into polar values. In the embodiment shown in FIG. 2 there are eight quantized phases, but it is to be understood that L may be any desired number. The relationship between the Cartesian domain and phase-quantized domain is as follows:

$$I + jQ = \sqrt{I^2 + Q^2} \exp\left(j\tan^{-1}\left(\frac{Q}{I}\right)\right)$$

$$A = \sqrt{I^2 + Q^2}$$

$$\theta = \tan^{-1}\left(\frac{Q}{I}\right)$$

$$I + jQ = A\exp(j\theta)$$

In the expression above, A is the magnitude and θ is the phase in radians. The approximated magnitude $A_n$ and the phase value of an input sample n are mapped to an N×L matrix, identified in FIG. 2 as phase-column indexed matrix Y, where the sample number n indicates the row number of the N×L matrix and the quantized phase integer indicates the column number of the N×L matrix. The N×L matrix is stored in a memory store 24, which is operatively coupled to the processor 22.

Figure 3:
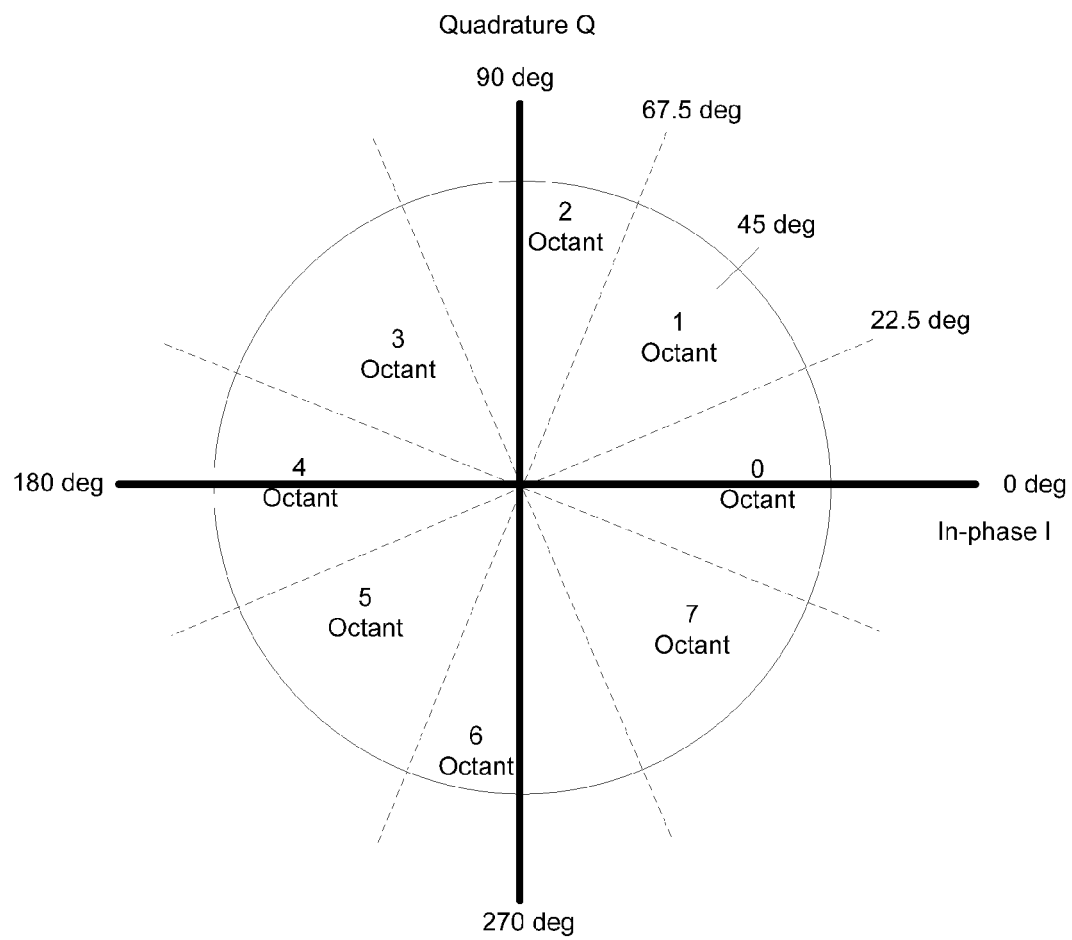
FIG. 3 is a phasor diagram showing phase numbers displayed on I and Q axes.

FIG. 3 is a phasor diagram showing phase numbers displayed on I and Q axes for the case of L=8. The phase quantization maps the input I/Q values to one of eight phases in the interval {0, 1, 2, 3, 4, 5, 6, 7}. These integers represent the phases {0°, 45°, 90°, 135°, 180°, 225°, 270°, 315°}. The eight phases and their decision regions are represented in FIG. 2 as those regions enclosed by the dashed lines. In this example, phase zero encompasses the input phase angles greater than or equal to −22.5° and less than 22.5°, phase one encompasses the input phase angles greater than or equal to 22.5° and less than 67.5°, and so on.

Figure 4:
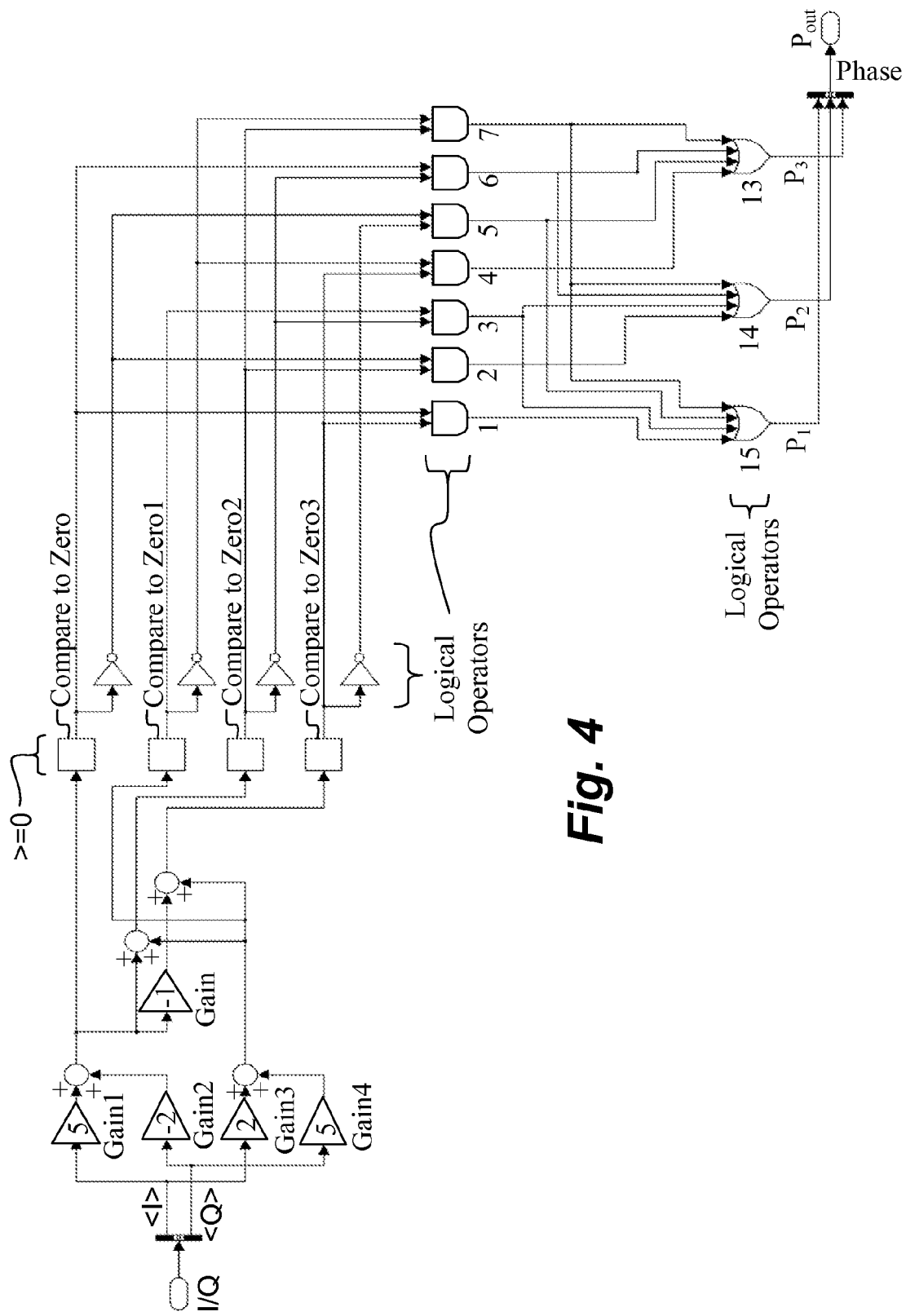
FIG. 4 is circuit diagram showing an example embodiment of how the phase quantization can be accomplished with logic.

FIG. 4 is circuit diagram showing an example embodiment of how the quantization can be accomplished with logic. Regardless of the number of bits in the input sample, a 3-bit phase is produced representing the phases {0°, 45°, 90°, 135°, 180°, 225°, 270°, 315°}. Note that the amplitude of the complex I/Q sample does not affect the phase value. The input signal in FIG. 4 is first rotated approximately 22.5° with the computations $$I = 5I - 2Q = (4I + I) - 2Q$$

$$Q = 2I + 5Q = 2I + (4Q + Q)$$

which are simply sums of bit-shifted versions of the digital input values. For example, the output I value becomes the input I value shifted to the left by two-bits plus the input I value with the input Q value shifted to the left one-bit subtracted. The input signal is phase quantized based on axes that have been rotated by 22.5°. The result is a quantized phase in the range {0,7} where the decision regions are centered about the phases they represent (as seen in FIG. 3). As shown in FIG. 4, the phase quantization can be accomplished with bit shifts, additions, and simple logic. Note, however, that this is just one of many known phase quantization schemes. The phase quantization may be implemented in any of a number of ways including by scaling the analog I/Q inputs prior to analog-to-digital conversion. The approximation $$\exp\left(j22.5°\frac{\pi}{180°}\right) \approx 5I + 2Q$$

is just one possible approximation.

The magnitude of a complex value is difficult to compute in hardware because of the squaring and square root operations. For this reason, an accurate approximation of the actual magnitude value is desired. One simple method is as follows:

$$A \approx \alpha \cdot \max(|I|, |Q|) + \beta \cdot \min(|I|, |Q|)$$

where α and β can be chosen to accommodate the level of accuracy and computation desired. A choice that provides reasonably accurate results is α=1 and β=¼. That is, the magnitude is the larger of I/Q plus ¼ of the smaller of I/Q. This is very simple to implement in hardware because ¼ is simply a shift to the right by two-bits for integers. Like the phase quantization, the magnitude approximation may be accomplished in any number of ways depending on the desired accuracy and acceptable computational complexity.

The magnitude may be approximated by any method. The method described above was chosen for its simplicity and accuracy. Different coefficients may be used, a lookup table approach may be implemented, or another approach may be used. Another example involves rotating the I/Q values by various phases (e.g., 22.5°, 45°, 67.5°) to identify the largest components along these rotated axes. This is more complicated, but would provide better magnitude approximations. One implementation of this scheme would be to compare the largest of 1) a 45° projection, ρ, 2) absolute value of the I component, |I|, and 3) the absolute value of the Q component, |Q|. The 45° projection is equivalent to adding |I| and |Q| together and dividing by √2. To avoid the multiplication by this irrational number, the approximation $1/\sqrt{2}=\frac{2}{3}$ may be used. Then the reported absolute value is the largest of $\{2\rho, 3\cdot|I|, 3\cdot|Q|\}$.

Referring back to FIG. 2 and as mentioned above, the quantized phase value from $\{0,7\}$ and the sample number n are used to index the approximated magnitude $A_n$ into the intermediate matrix Y. That is, the sample number n indicates the row number and the quantized phase indicates the column number. Again, the size of Y is N×L where N is the length of the input array $x_N$, and L is the number of quantized phases (8 for this description). When the length N input array has been converted to magnitude/phase and phase-indexed into the Y matrix, Y will have a single value in each row that is an approximation of its magnitude and in the column corresponding to the closest quantized phase value. The steps above with respect to approximating the magnitude and quantizing the phase of the input sample n may be repeated for all constituent input samples of the input data array $X_N$ until the N×L matrix is fully populated.

Also shown in FIG. 2, the multiplicand $s_M$ must also be phase quantized according to the scheme above, where M is the length of the reference signal. The multiplicand $s_M$ should be a constant modulus signal (i.e., amplitude does not change), but if not, it will just increase the error from the actual multiplication. For filters, FFT twiddle factors, or a frequency shift this multiplicand array could be phase-quantized prior to computations if it will not change. Thus, the complex multiplicand $s_M$ is converted to integers in the range $\{0,7\}$, just like the phases of the input array $X_N$. After quantization, the multiplicand is denoted $s_{M,p}$ where the "p" indicates it has been phase quantized. Then the processor 22 chooses an M×L subset of the N×L matrix as multiplicands and circularly shifts each of M rows to the right by the $m^{th}$ quantized phase value of the multiplicand $s_{M,p}$. That is, the L=8 values in the $m^{th}$ row are circularly shifted to the right by $s_{M,p}$ places, where $s_{M,p}$ is an integer in the range $\{0,7\}$. Instead of a complex multiplication of the reference point by the input value, a circular shift of the Y matrix performs the same function in this quantized polar domain. With L quantized phases in total, the reference signal only requires $\log_2(L)$ bits to store value. This is much smaller than the typical complex representations that often require 8-bits or more for both the I and Q values. Then the circularly shifted rows may be converted back to Cartesian coordinates to yield a reconstructed output array $y_K$.

In standard DSP operations involving a frequency shift, M reference points would multiply M points of the input signal. In the no-multiply DSP method 10, on the other hand, the result is just the input signal where each row has been independently shifted by the corresponding phase quantized reference value.

In standard DSP operations involving a FIR filter, all M points of the reference would multiply sets of M points of the input signal spaced by one sample and the results would be summed. In method 10, on the other hand, the multiplication and addition steps are replaced by circularly shifting each of M rows to the right by the quantized phase value of the multiplicand and summing down the columns of Y so like phases are accumulated together such that the result of each sum is a 1×L array.

As indicated above, the no-multiply DSP method 10 may be used in DSP operations involving DFTs and FFTs. Standard methods for calculating DFTs and FFTs require multiplications of real or complex input values by complex twiddle factors. The twiddle factors are integer powers of $W_N$, where $$W_N = \exp(-j2\pi/N)$$

A common form of the FFT is the Cooley-Tukey implementation, which can be expressed as $$X_k = \begin{cases} E_k + \exp\left(-\frac{j2\pi}{N}k\right)O_k & \text{if } k < N/2 \\ E_{k-N/2} - \exp\left(-\frac{j2\pi}{N}(k-N/2)\right)O_{k-N/2} & \text{if } k \geq N/2 \end{cases}$$

where $$E_k = \sum_{m=0}^{N/2-1} x_{2m}\exp\left(-\frac{j2\pi}{N/2}mk\right)$$

$$O_k = \sum_{m=0}^{N/2-1} x_{2m+1}\exp\left(-\frac{j2\pi}{N/2}mk\right)$$

That is, the DFT of length N can be expressed as a recursion of two DFTs of size N/2. This is the core of the Cooley-Tukey FFT (also known as the radix-2 decimation-in-time FFT).

Figure 5:
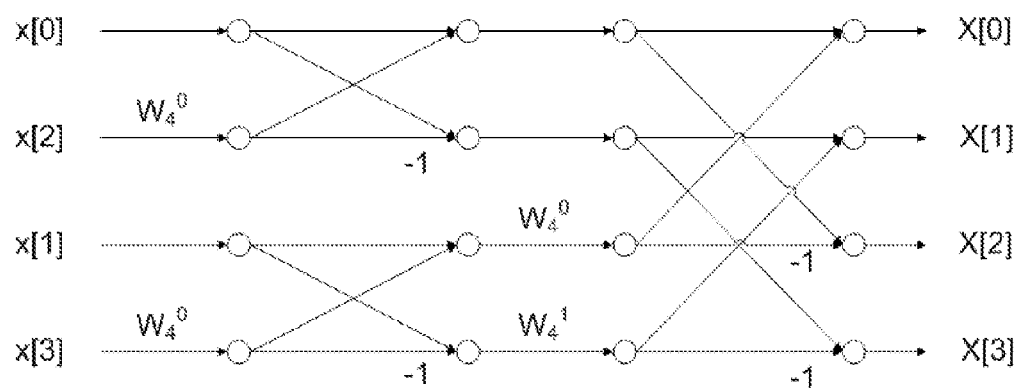
FIG. 5 is an illustration of a Cooley-Tukey algorithm applied to a 4-point fast Fourier transform.

FIG. 5 is an example illustration of the Cooley-Tukey algorithm applied to a 4-pt FFT. Note that in this embodiment, the input vector enters the algorithm in bit-reversed order. The FFT is broken down into K stages where $K=\log_2(N)$ and each stage has N complex multiplications and N complex additions (though it is true that some of the multipliers turn out to be 1 and −1, which do not require a full multiplication). There are many other FFTs besides the Cooley-Tukey algorithm, some of which reduce the number of complex multiplications necessary, but none entirely eliminate them. Thus, without the no-multiply method 10, FFTs end up being relatively costly to implement in hardware and embedded processors.

Figure 6:
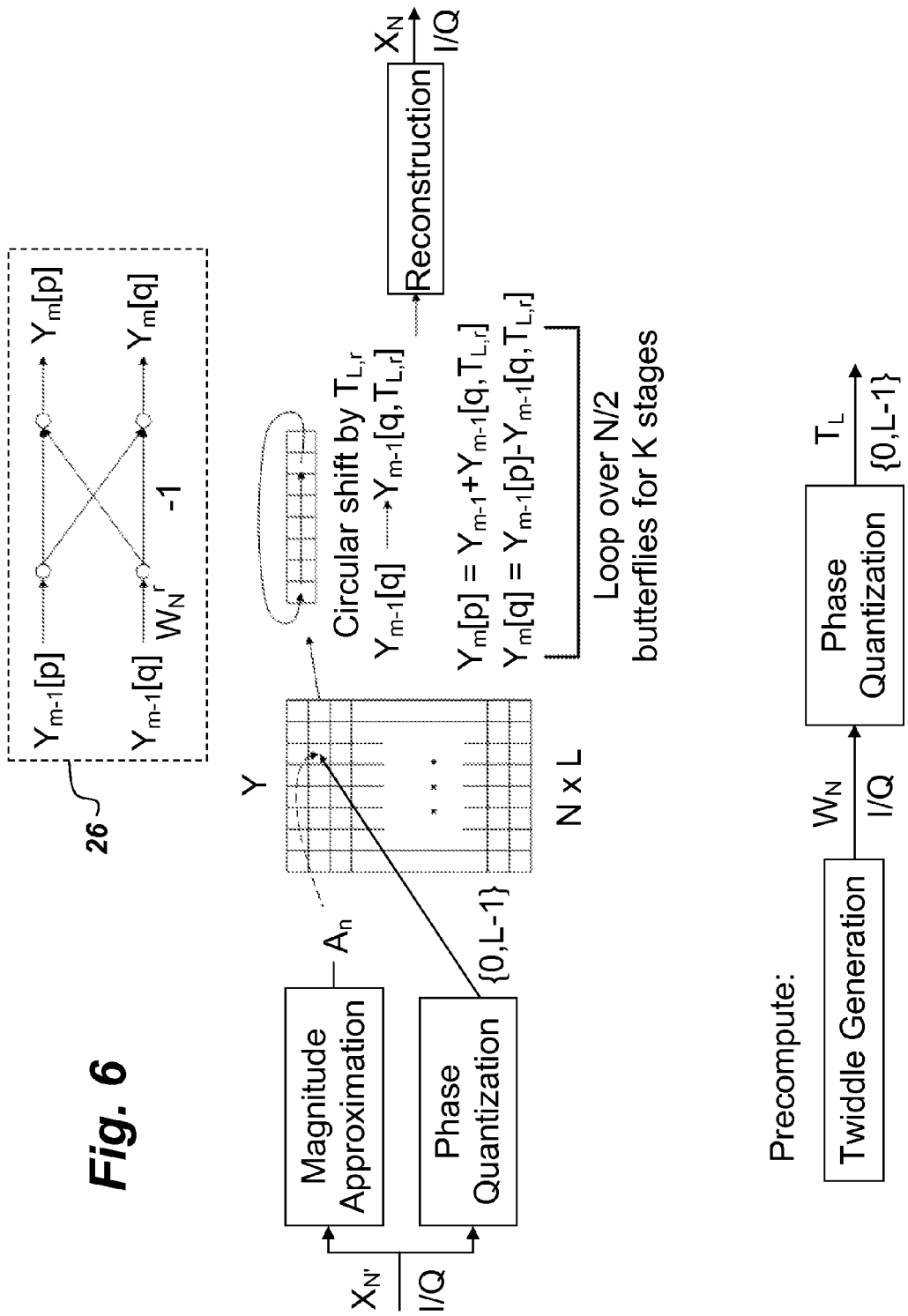
FIG. 6 is a block diagram showing another embodiment of the no-multiply DSP method involving a fast Fourier transform.

FIG. 6 is a block diagram showing another embodiment of the no-multiply DSP method 10 involving an FFT. The following description of this embodiment of method 10 will be carried out for the case where the number of quantized phases L=8 for convenience of description with no loss of generality. First, the complex-valued input data array $x_{N'}$ of length N enters the system. The prime in $x_{N'}$ denotes that the input array has already been permuted in bit-reversed order, which is standard practice for decimation-in-time FFTs. The real- or complex-valued input array is converted to magnitude and phase. As in the embodiment shown in FIG. 2, in this embodiment the phase quantization maps the input I/Q values to one of 8 phases in the interval $\{0, 1, 2, 3, 4, 5, 6, 7\}$.

The twiddle factors for the FFT must be computed and phase-quantized according to the scheme described above. The magnitude of each twiddle factor is one so only the quantized phase values must be stored. The twiddle factor phase quantization step, however, may be performed prior to the approximation and phase quantization of the input data array $x_{N'}$ and the results reused. The twiddle factors in a standard FFT are integer powers of $W_N$ from $\{0, N/2\}$, and thus are complex numbers. After phase quantization the twiddle factors are denoted $T_L$, where L=8 is the number of quantized phases in this embodiment. The phase quantized twiddle factors $T_L$ are integers in the range $\{0,7\}$, just like the quantized phases of the input array $x_{N'}$.

Next, the butterfly computations must be carried out. In the Cooley-Tukey implementation there are N/2 butterflies in each of the K stages, where, again, $K=\log_2(N)$. A butterfly diagram 26 is shown at the top of FIG. 6. The indices p and q vary as does the twiddle factor $W_n^r$ for each butterfly computation. These values may be found in any text on Cooley- Tukey algorithms, but the salient point is that the twiddle factor multiplications in the no-multiply method 10 are accomplished by circular shifts of row q. That is, the L=8 values in the q row are circularly shifted to the right by $T_{L,r}$ places where $T_{L,r}$ is an integer in the range {0,7}. Instead of a complex multiplication of the twiddle factor by the input value, a circular shift of the Y matrix performs the same function.

At the $(m-1)^{th}$ stage of the FFT, the $q^{th}$ row of Y is denoted $Y_{m-1}[q]$ and the $p^{th}$ row by $Y_{m-1}[p]$. A butterfly computation involving indices p and q would proceed as follows. After the shifting by the phase-quantized twiddle factor value $T_{L,r}$ to accomplish the multiplication, $Y_{m-1}[q]$ becomes $Y_{m-1}[q, T_{L,r}]$. Y values for the $m^{th}$ stage are generated as the sum and difference of $Y_{m-1}[q,T_{L,r}]$ and $Y_{m-1}[p]$. That is, $$Y_m[p]=Y_{m-1}[p]+Y_{m-1}[q,T_{L,r}]$$

$$Y_m[q]=Y_{m-1}[p]-Y_{m-1}[q,T_{L,r}]$$

This is just a point-by-point addition and point-by-point subtraction of two 1×8 vectors (for L=8 phases). The $m^{th}$ stage terms $Y_m[p]$ and $Y_m[q]$ are also 1×8 vectors where each column represents the contribution of that quantized phase.

The real magnitude value in each element of the matrix indicates the amount of contribution of that phase to the complex value. For example, say $Y_m[p]=[A_{p,0}, A_{p,1}, A_{p,2}, A_{p,3}, A_{p,4}, A_{p,5}, A_{p,6}, A_{p,7}]$, where the elements are all real integers. Then the value of the $p^{th}$ sample at stage m would be $$Y_m[p] = A_{p,0} \cdot \exp\left(j2\pi\frac{0}{8}\right) + A_{p,1} \cdot \exp\left(j2\pi\frac{1}{8}\right) +$$
$$A_{p,2} \cdot \exp\left(j2\pi\frac{2}{8}\right) + A_{p,3} \cdot \exp\left(j2\pi\frac{3}{8}\right) + A_{p,4} \cdot \exp\left(j2\pi\frac{4}{8}\right) +$$
$$A_{p,5} \cdot \exp\left(j2\pi\frac{5}{8}\right) + A_{p,6} \cdot \exp\left(j2\pi\frac{6}{8}\right) + A_{p,7} \cdot \exp\left(j2\pi\frac{7}{8}\right)$$

$$Y_m[p] = \left[(A_{p,0} - A_{p,4}) + \frac{1}{\sqrt{2}} \cdot (A_{p,1} + A_{p,7} - A_{p,3} - A_{p,5})\right] +$$
$$j\left[(A_{p,2} - A_{p,6}) + \frac{1}{\sqrt{2}} \cdot (A_{p,1} + A_{p,3} - A_{p,5} - A_{p,7})\right]$$

When the K stages involving N/2 butterfly computations are completed, the output value of the method 10 must be calculated by reconstructing the I/Q values from the quantized magnitudes and phases. This can be done in a number of ways, but a simple and efficient method is to use to the approximation that $1/\sqrt{2} \approx 2/3$ in the last expression above. The expression then reduces to $$Y_m[p] \approx \left[(A_{p,0} - A_{p,4}) + \frac{2}{3} \cdot (A_{p,1} + A_{p,7} - A_{p,3} - A_{p,5})\right] +$$
$$j\left[(A_{p,2} - A_{p,6}) + \frac{2}{3} \cdot (A_{p,1} + A_{p,3} - A_{p,5} - A_{p,7})\right]$$

And because the absolute scale of the FFT results is typically not important, the whole expression can be "multiplied" by three as shown below $$3 \cdot Y_m[p] \approx [3 \cdot (A_{p,0} - A_{p,4}) + 2 \cdot (A_{p,1} + A_{p,7} - A_{p,3} - A_{p,5})] +$$
$$j[3 \cdot (A_{p,2} - A_{p,6}) + 2 \cdot (A_{p,1} + A_{p,3} - A_{p,5} - A_{p,7})]$$

This is a very simple expression because a multiplication by two is just a shift of an integer to the left 1-bit, and a multiplication by three is just the value multiplied by two added to that value. The $1/\sqrt{2} \approx 2/3$ approximation is one possible approximation for the I/Q reconstruction at the output of the FFT. Another is $1/\sqrt{2} \approx 12/17$, which is slightly more difficult to implement, but is a better approximation.

The 1×L arrays are converted back to Cartesian coordinates as follows where the columns of Y are numbered {0,7} and the $p^{th}$ row is considered:

$$y[p] = Y[p, 0] \cdot \exp\left(j2\pi\frac{0}{8}\right) + Y[p, 1] \cdot \exp\left(j2\pi\frac{1}{8}\right) +$$
$$Y[p, 2] \cdot \exp\left(j2\pi\frac{2}{8}\right) + Y[p, 3] \cdot \exp\left(j2\pi\frac{3}{8}\right) + Y[p, 4] \cdot \exp\left(j2\pi\frac{4}{8}\right) +$$
$$Y[p, 5] \cdot \exp\left(j2\pi\frac{5}{8}\right) + Y[p, 6] \cdot \exp\left(j2\pi\frac{6}{8}\right) + Y[p, 7] \cdot \exp\left(j2\pi\frac{7}{8}\right)$$

$$y[p] = \left[(Y[p, 0] - Y[p, 4]) +\right.$$
$$\left.\frac{1}{\sqrt{2}} \cdot (Y[p, 1] + Y[p, 7] - Y[p, 3] - Y[p, 5])\right] +$$
$$j\left[(Y[p, 2] - Y[p, 6]) + \frac{1}{\sqrt{2}} \cdot (Y[p, 1] + Y[p, 3] - Y[p, 5] - Y[p, 7])\right]$$

As with the FFT embodiment, a simple and efficient way to compute the last expression above is to use to the approximation that $1/\sqrt{2} \approx 2/3$. The expression then reduces to $$y[p] \approx \left[(Y[p, 0] - Y[p, 4]) + \frac{2}{3} \cdot (Y[p, 1] + Y[p, 7] - Y[p, 3] - Y[p, 5])\right] +$$
$$j\left[(Y[p, 2] - Y[p, 6]) + \frac{2}{3} \cdot (Y[p, 1] + Y[p, 3] - Y[p, 5] - Y[p, 7])\right]$$

In some applications, the errors due to magnitude approximations and phase quantization may be acceptable. Also in other applications which require sums (such as filters) the errors are averaged out due to dither, especially over the summation of long vectors. In this way, the output array $y_K$ can be generated that closely approximates the result that would be obtained from standard digital signal processing with multiplications.

As an alternative embodiment, the number of columns used in the intermediate matrix Y can be halved to L/2 by taking advantage of the fact that phases 180° apart are negatives. For example, 225° is the negative of 45°. Thus, instead of adding a value to the bin representing 225° (bin 5 in the 8-phase case), one can just subtract that value from the bin representing 45° (bin 1). This makes the circular shift a little more complicated because certain values must be negated depending on the twiddle phase. Using half of the phases, however, results in a lower storage requirement.

From the above description of the no-multiply DSP method 10, it is manifest that various techniques may be used for implementing the concepts of the method 10 without departing from its scope. The described embodiments are to be considered in all respects as illustrative and not restrictive. It should also be understood that the no-multiply DSP method 10 is not limited to the particular embodiments described herein, but is capable of many embodiments without departing from the scope of the claims.

We claim:

1. A method for processing a digital signal, comprising the following steps:
   receiving a complex-valued input data array with a processor;
   converting the complex-valued input data array into a quantized polar domain by approximating magnitude and quantizing phase data of the input data array with the processor;
   storing the approximated magnitude in a phase-column indexed matrix in a memory store that is operatively coupled to the processor;
   processing the input data array with the processor such that all multiplications and summations that would occur during signal processing of the input data array in the Cartesian domain are substituted with circular row shifts and additions of phase-column indexed values in the quantized polar domain; and
   converting the processed input data array back into the Cartesian domain.

2. The method of claim 1, wherein the step of processing the input data array comprises filtering the input data array with a finite impulse response (FIR) filter.

3. The method of claim 1, wherein the step of processing the input data array comprises shifting the frequency of the input data array.

4. The method of claim 1, wherein the step of processing the input data array comprises calculating a fast Fourier transform (FFT).

5. The method of claim 1, wherein the processor is part of a field programmable gate array (FPGA).

6. The method of claim 1, wherein the processor is part of an application specific integrated circuit (ASIC).

7. The method of claim 1, wherein for a given multiplicand, from a constant modulus signal, of a multiplication that would occur during signal processing of the input data array in the Cartesian domain, the given multiplicand is phase-quantized to obtain a quantized phase value, and wherein rows in the polar domain that represent the multiplicand are circularly shifted by the quantized phase value.

8. The method of claim 7, wherein the step of converting the processed input data array back into the Cartesian domain utilizes an approximation that $1/\sqrt{2} \approx 2/3$.

9. A method for eliminating multiplication steps during digital signal processing (DSP), comprising the following steps:
   a. receiving a complex-valued input data array $X_N$ in a Cartesian domain with a processor, wherein N is the length of the input data array $X_N$;
   b. converting the input data array $X_N$ into a quantized polar domain by:
      i. approximating the magnitude $A_n$ of an input sample n, wherein the input sample n is a portion of the input data array $X_N$, and
      ii. mapping a phase value of the input sample n to one of L quantized phases, represented by integers from 0 to L−1;
   c. indexing the approximated magnitude $A_n$ by the quantized phase value of the input sample n to an N×L matrix, wherein the sample number n indicates the row number of the N×L matrix and the quantized phase integer indicates the column number of the N×L matrix, and wherein the N×L matrix is stored in a memory store operatively coupled to the processor;
   d. repeating steps b-c for all constituent input samples of the input data array $X_N$ thereby populating the N×L matrix;
   e. phase quantizing a constant modulus multiplicand $s_M$ from the Cartesian domain to an integer array $s_{M,p}$ in the range {0, L−1} in the polar domain, wherein M is the length of a reference signal;
   f. choosing an M×L subset of the N×L matrix and circularly shifting each of M rows to the right by the $m^{th}$ quantized phase value of the integer array $s_{M,p}$; and
   g. converting the circularly shifted rows from step (f) back to Cartesian coordinates.

10. The method of claim 9, wherein L equals eight quantized phases.

11. The method of claim 9, wherein step b(ii) is performed with a logic circuit.

12. The method of claim 11, wherein $A_n$ is approximated according to the following equation:

$$A \approx \alpha * \max(|I|,|Q|) + \beta * \min(|I|,|Q|)$$

where α and β are user defined variables and I and Q represent the real and imaginary components respectively of the input sample n.

13. The method of claim 12, wherein α and β are equal to one and one fourth respectively.

14. The method of claim 12, wherein for DSP processes involving fast Fourier transforms (FFT), the method of claim 12 further comprises the step of:
   phase-quantizing twiddle factors with the processor;
   storing the phase-quantized twiddle factors in a N×1 matrix in the memory store; and
   performing butterfly computations using the N×L data matrix, wherein all complex multiplications of twiddle factors by input values that would be performed in the Cartesian domain are instead performed in the phase-quantized domain by circular shifts of phase-indexed magnitudes stored in the N×L matrix and all complex additions are performed by adding rows.

15. The method of claim 12, wherein the step of converting the circularly shifted rows from step (f) back to Cartesian coordinates utilizes an approximation that $1/\sqrt{2} \approx 2/3$.

16. The method of claim 12, wherein the step of converting the circularly shifted rows from step (f) back to Cartesian coordinates utilizes an approximation that $1/\sqrt{2} \approx 12/17$.

17. The method of claim 9, wherein for DSP processes involving finite impulse response (FIR) filter operations, each multiplication that would be performed in the Cartesian domain of all M points of the reference signal by sets of M points of the input data array spaced by one sample and a subsequent summation of the results of the multiplications that would be performed in the Cartesian domain are replaced by:
   circularly shifting each of M rows to the right by the integer array $s_{M,p}$;
   summing each column of the N×L matrix in the quantized phase domain, wherein the result of each sum is a 1×L array; and
   converting the 1×L arrays back into Cartesian coordinates.

18. The method of claim 9, wherein for DSP processes involving frequency shift operations, a multiplication of M reference points by M points of the input data array that would be performed in the Cartesian domain is replaced by independently shifting each row of N×L matrix by the corresponding phase quantized reference value.

* * * * *